United States Patent [19]

Pehr

[11] E Re. 29,793

[45] Reissued Oct. 3, 1978

[54] CONTAINER COVER AND SAFETY CLOSURE

[76] Inventor: Harold T. Pehr, 3920 W. 96th St., Overland Park, Kans. 66207

[21] Appl. No.: 837,916

[22] Filed: Sep. 29, 1977

Related U.S. Patent Documents

Reissue of:

[64] Patent No.: 4,022,352
Issued: May 10, 1977
Appl. No.: 680,524
Filed: Apr. 26, 1976

[51] Int. Cl.[2] ..... B65D 5/32

[52] U.S. Cl. ..... 222/153; 222/546; 222/556; 215/211; 215/224; 215/301; 220/306; 220/281

[58] Field of Search ..... 220/281, 306, 375; 215/224, 211, 301, 305, 306; 222/153, 546, 556

[56] References Cited

U.S. PATENT DOCUMENTS

| | | | |
|---|---|---|---|
| 3,877,598 | 4/1975 | Hazard | 215/224 |
| 3,927,805 | 12/1975 | Stull | 222/153 |

*Primary Examiner*—George T. Hall
*Attorney, Agent, or Firm*—Fishburn, Gold & Litman

[57] ABSTRACT

A cover and safety closure structure for a container having a flowable material therein includes a cap member integral with or mounted on the container and having a material dispensing aperture in a top wall of the cap member. A closure member is hingedly mounted on the cap member and is movable between an open position and a position in covering relation with and closing the material dispensing aperture. A latch member extends from the closure member and the latch member and the cap member have cooperative portions engageable one with the other for retaining the closure member in covering relation with and closing the material dispensing aperture. The cover and closure structure includes a resilient member or members mounted on one of the cap member and the closure member and engageable with the other of the cap member and closure member for urging the cooperative portions of the latch member and cap member into retaning engagement. To move the closure member to the open position, it is first necessary to move a portion of the closure member toward the cap member against resistance of the resilient member or members and second to separate the cooperating portions on the latch member and the cap member and then move the closure member to the open position.

15 Claims, 16 Drawing Figures

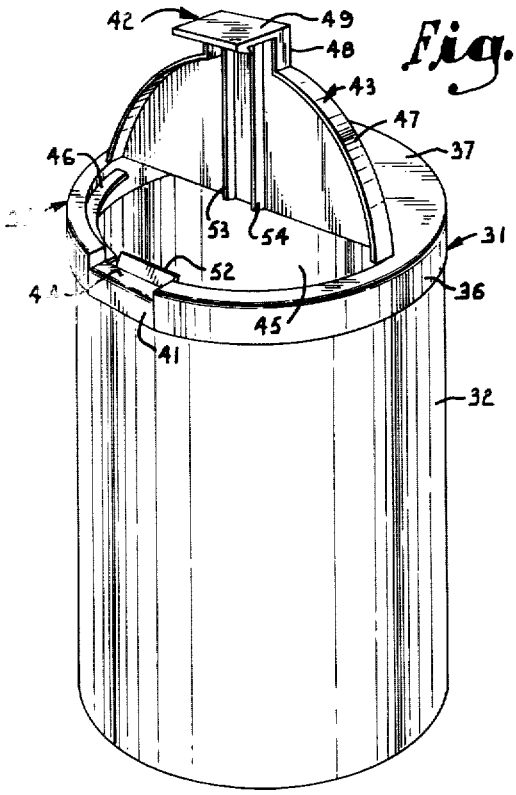
Fig. 5.
Fig. 6.
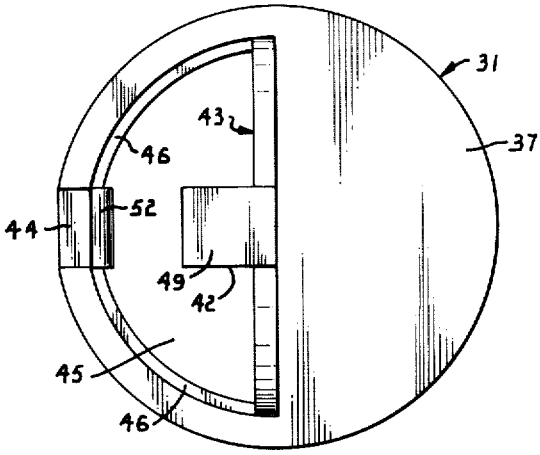
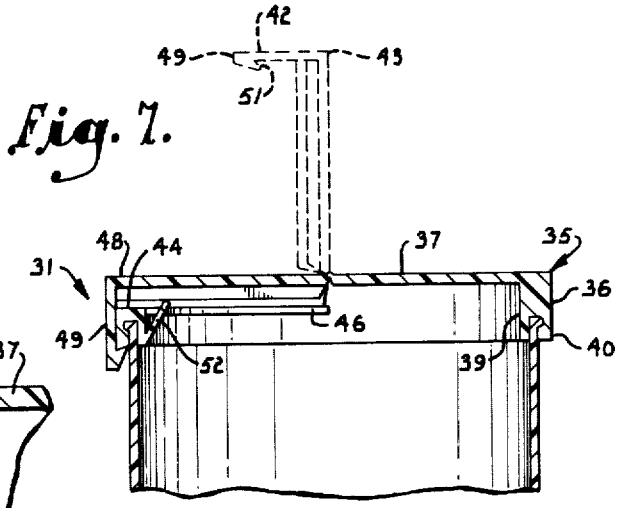
Fig. 7.
Fig. 8.
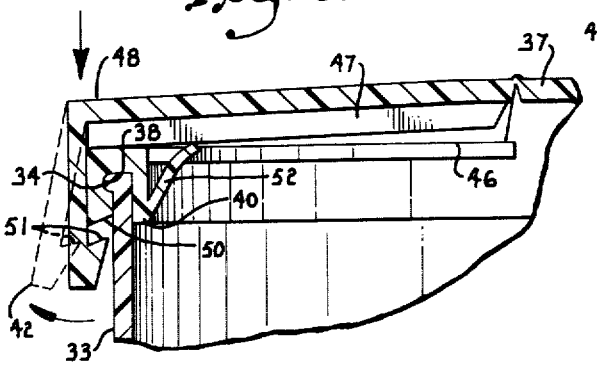

CONTAINER COVER AND SAFETY CLOSURE

Matter enclosed in heavy brackets [ ] appears in the original patent but forms no part of this reissue specification; matter printed in italics indicates the additions made by reissue.

The present invention relates to material dispensing devices and more particularly to a material dispensing cover and safety closure structure for a container with the structure having a releasable latch and a resilient portion or portions on a cap member or closure member to urge the closure member away from the cap member to maintain the latch engaged in closed position until the closure member is pressed or moved toward the cap member to permit release of the latch and opening of the closure member.

The principal objects of the present invention are: to provide a material dispensing cover and safety closure structure for a container and having a releasable latch and a resilient portion or portions on a cap member or closure member to urge the closure member away from the cap member to maintain the latch engaged in closed position until the closure member is pressed or moved toward the cap member to permit release of the latch and opening of the closure member; to provide such a cover and closure structure wherein a material dispensing aperture in a cap member is closed by portions on the closure member until the latch is released and the closure member is moved to an open position; to provide such a cover and closure structure formed as a one piece molded assembly with the closure member hingedly mounted on the cap member and the cap member and closure member have cooperating portions for retaining the closure member in covering relation with the material dispensing aperture; to provide such a cover and closure structure particularly adapted for dispensing liquid material and for providing a liquid tight seal when the closure member is in covering relation with the cap member; to provide such a cover and closure structure which may be modified for use in dispensing granular material, such as salt, pepper, sugar, spices, tablets, pills, and the like; to provide such a cover and closure structure wherein the cap member has guideways therein receiving respective portions of the closure member and latch to position same for sealing the material dispensing aperture; to provide such a cover and closure structure which may be mounted on or be integral with a container having therein material to be dispensed; and to provide such a cover and closure structure formed of flexible and resilient material and which is durable in construction, attractive in appearance, positive in operation, and particularly well adapted for the proposed use.

Other objects and advantages of this invention will become apparent from the following descriptions taken in connection with the accompanying drawings wherein are set forth, by way of illustration and example, certain embodiments of this invention.

The drawings constitute a part of the specification and include exemplary embodiments of the present invention and illustrate various objects and features of the container cover and closure structure.

FIG. 5 is a perspective view of a first modified form of the container cover and closure structure and showing a modified closure member in an open position.

FIG. 6 is a top plan view of the first modified form of the container cover and closure structure and showing the modified closure member in the open position.

FIG. 7 is a vertical section view of the first modified form of the container cover and closure structure and showing the modified closure member in a closed position with the open position shown in broken lines.

FIG. 8 is an enlarged fragmentary vertical sectional view showing a portion of the modified closure member moved toward a cap member to permit separation of a latch member prior to moving the modified closure member to the open position.

Figure 1:
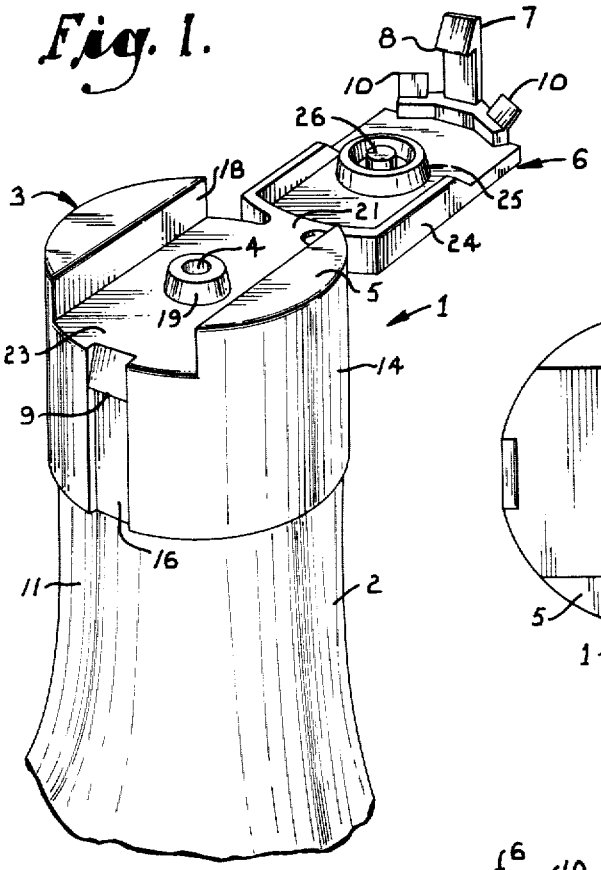
FIG. 1 is a perspective view of a container cover and closure structure embodying features of the present invention and showing a closure member in an open position.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a container cover and safety closure structure for a container 2 having a flowable material therein. The container cover and closure structure 1 includes a cap member 3 integral with or mounted on the container 2 and having a material dispensing aperture 4 in a wall 5 of the cap member 3. A closure member 6 is hingedly mounted on the cap member 3 and is movable between an open position and a position in covering relation with and closing the material dispensing aperture 4. A latch member 7, closure member 6 and cap member 3 have cooperating portions 8 and 9 respectively engageable one with the other for retaining the closure member 6 in covering relation with and closing the material dispensing aperture 4. The cover and closure structure 1 includes a resilient member or members 10 for urging the cooperating portions 8 and 9 on the latch member 7 and the cap member 3 into retaining engagement. To move the closure member 3 to the open position, it is first necessary to move at least a portion of the closure member 6 toward the cap member 3 against resistance of the resilient member or members 10 and second to separate the cooperating portions 8 and 9 and then move the closure member 6 to the open position.

The container 2 may be any suitable size and shape for retaining therein material to be dispensed. The illustrated container 2 has a neck portion 11 with a lip 12 at an upper end of the neck portion 11 thereby defining a downwardly facing shoulder. The container 2 is formed of flexible and resilient material so that the cap member 3 may be mounted on the neck portion 11 of the container 2.

The cap member 1 has a side wall 14 depending from the top wall 5 and the side wall 14 is adapted to surround the neck portion 11 of the container 2. The side wall 14 has means engageable with the container wall for retaining the cap member 3 on the container 2. In the illustrated method of mounting the cap member 3 on the neck portion 11 of the container 2, the side wall 14 has an inwardly extending rib for bead 15 adjacent a lower edge of an interior surface of the cap member side wall 14. The bead or rib 15 and the downwardly facing shoulder defined by the lip 12 on the neck portion 11 of the container 2 cooperate to retain the cap member 3 on the container neck portion 11.

An exterior surface of the cap member side wall 14 has a guide recess or way 16 therein which extends between a lower edge of the side wall 14 and the cap member top wall 5. The latch 7 is received in the guide way 16 in the cap member side wall 14. A downwardly inclined shoulder 17 is formed in the guide way 16 in the cap member side wall 14 and the downwardly inclined shoulder 17 is positioned adjacent the cap member top wall 5. The shoulder 17 terminates in a lower edge spaced from the outwardly facing surface of the walls defining the guide way 16. In the illustrated structure, an upwardly and inwardly inclined surface extends from the lower edge of the shoulder 17 and toward the cap member top wall 5. The cap member top wall 5 also has a guide way or recess 18 therein and extending between opposite side edges of the top wall 5. The guide way 18 in the top wall 5 and the guide way 16 in the side wall 14 intersect at one of the opposite side edges of the cap member top wall 5.

The material dispensing aperture 4 is formed in the cap member top wall 5 and in the illustrated embodiment, the material dispensing aperture 4 is defined by a tubular portion 19 extending upwardly from the top wall 5 and having a bore 20 therethrough. The tubular portion 19 is positioned within the guide way 18.

The closure member 6 has one end portion thereof hingedly mounted on the cap member top wall 5 by a hinge portion 21 positioned in opposed relation to the guide way 16 in the cap member side wall 14. The closure member 6 has a wall portion 22 adapted to be in covering relation with a center portion 23 of the top wall 5 within the guide way 18. Peripheral edge flanges 24 extend substantially perpendicular or normal to the wall portion 22 and are engageable with the center portion 23 of the cap member top wall 5 and thereby provide support for the closure member wall portion 22. The edge flanges 24 are formed on the one end portion of the closure member 6 and terminate within an intermediate portion of the closure member wall portion 22 so that the one end portion having the edge flanges 24 thereon is in supported engagement with or on the center portion 23 of the cap member top wall 5. The other end portion of the closure member wall portion 22 between the ends of the edge flanges 24 and the latch 7 is flexible and may be moved toward the center portion 23 of the cap member top wall 5.

The closure member 6 has means thereon for closing the material dispensing aperture 4 when the closure member 6 is in covering relation with the cap member top wall 5 and the material dispensing aperture 4. In the illustrated embodiment, a sleeve portion 25 extends from the intermediate portion of the wall portion 22 of the closure member 6 and surrounds the tubular portion 19 when the closure member 6 is in covering relation with the material dispensing aperture 4. The tubular portion 19 defining the material dispensing aperture 4 and the sleeve portion 25 are spaced from the guide way 16 in the cap member side wall 14 and the latch 7 respectively.

A pin or projection 26 extends from an intermediate portion of the closure member wall portion 22 and is positioned within and surrounded by the sleeve portion 25. The pin or projection 27 is frictionally received within the bore 20 of the tubular 27 is frictionally received within the bore 20 of the tubular portion 19 thereby providing a liquid tight seal or closure for the material dispensing aperture 4 when the closure member 6 is in covering relation with the material dispensing aperture 4.

The latch 7 is formed as a portion of the closure member 6 and extends from the other end portion of the closure member 6 and is substantially perpendicular or normal to the wall portion 22 of the closure member 6. The latch portion 7 is received in the guide way 16 in the cap member side wall 14.

The latch 7 has a projection or rib defining an upwardly inclined shoulder 27 on a latch surface facing the cap member side wall 14. The upwardly inclined shoulder 27 on the latch 7 is engaeable with the downwardly inclined shoulder 17 within the guide way 16 in the cap member side wall 14. The downwardly inclined shoulder 17 and the upwardly inclined shoulder 27 on the cap member side wall 14 and the latch 7 respectively thereby define cooperating means on the cap member side wall 14 and the latch 7 which are engageable one with the other for retaining the closure member 6 in covering relation with the material dispensing aperture 4.

The cover and closure structure 1 includes one or more resilient members 10 on one of the closure member 6 and the cap member 3 for urging the cooperating means defined by the shoulders 17 and 27 on the cap member side wall 14 and the latch 7 respectively into retaining engagement one with the other. The one end portion of the closure member wall portion 22 and the latch 7 thereon is movable towards the cap member top wall 5 against resistance of the resilient member or members 10 to permit separation of the shoulders 17 and 27 on the cap member side wall 14 and the latch 7 respectively.

In the illustrated embodiment, the closure member 6 has two resilient members 10 on the wall portion 22 and positioned on the opposite sides of the latch 7 at the other end portion of the closure member wall portion 22 and the resilient member 10 are integral with the closure member 6.

The cap member 3, closure member 6, latch 7, and resilient member 10 are formed as a one-piece molded structure of a suitable flexible and resilient plastic.

In using a cover and closure structure 1 as illustrated and described, the container 2 is filled with the desired material to be dispensed such as a liquid soap, body or hand lotion shampoo, hair creme or conditioner, and the like. The cap member 3 is moved downwardly over the neck portion 11 of the container 2 until the bead or rib 15 on the cap member side wall 14 moves over and under the lip 12 on the neck portion 11 of the container 2. The closure member 6 is moved to a position overlying or in covering relation with the cap member top wall 5 and the material dispensing aperture 4 so that the sleeve portion 26 on the closure member wall portion 22 surrounds the tubular portion 19 extending upwardly from the cap member top wall 5 and the pin or projection 26 is received in the bore 20 of the tubular projection or portion 19. The latch 7 is received in the guide way 16 in the cap member side wall 14. The other end portion of the closure member wall portion 22 adjacent the latch 7 is depressed to allow the shoulders 17 and 27 to engage. Release of the other end portion of the closure member wall portion 22 effects seating engagement of the shoulder 27 on the latch 7 with the shoulder 17 on the cap member side wall 14. When it is desired to dispense material through the material dispensing aperture 4, the other end portion of the closure member wall portion 22 adjacent the latch 7 is depressed or moved toward the cap member top wall 5 and the free end of the latch 7 is moved out of the guide way 16 in the cap member side wall 14 and then outwardly from the cap member side wall 14 so that the closure member 6 may be moved to the open position.

FIGS. 5 to 8 inclusive illustrate a first modified form of a container cover and closure structure 31 particularly adapted for use in dispensing a granular material, such as salt, sugar, pepper, spices, tablets, pills, and the like. In the form illustrated, a container 32 has an upper portion 33 with a outwardly extending lip 34 on the side wall of the container 32 thereby defining a downwardly facing shoulder. The container 32 is formed of flexible and resilient material so that a cap member 35 may be mounted on the upper end portion 33 of the container 32.

The illustrated cap member 35 has a side wall 36 depending from a top wall 37 and the cap member 35 is adapted to surround the upper end portion 33 of the container 32. The cap member side wall 36 has means engageable with the container wall adjacent the upper end portion 33 for retaining the cap member 35 on the container 32. In the illustrated method of mounting the cap member 35 on the container 32, the cap member side wall 36 has a recess 38 therein and positioned adjacent a lower edge of an interior surface of the cap member side wall 36. The recess 38 is adapted to receive therein the lip 34 on the exterior surface of the container wall adjacent the upper end portion 33 of the container 32.

The illustrated cap member side wall 36 has an inner wall portion 39 and an outer wall portion 40. The outer wall portion 40 extends around the entire circumference of the cap member 35 and has the recess 38 therein. The inner wall portion 39 may extend around the entire circumference of the interior surface of the container side wall, however, it is preferred that the inner wall portion 39 extend at least around a major portion of the circumference of the cap member side wall 36.

The exterior surface of the cap member outer wall portion 40 has a guide recess or way 41 therein. A latch member 42 extends from a modified closure member 43 which is hingedly mounted on the top wall 37 of the cap member 35. The latch member 43 is received in the guide recess or way 41 in the cap member side wall 36. A guide recess or way 44 is formed in the cap member top wall 37 and extends between the inner and outer wall portions 39 and 40 of the side wall 36. The recess 44 in the cap member top wall 37 intersects the guide recess 41 in the side wall 36 of the cap member 35.

The material dispensing aperture 45 is formed in the cap member top wall 37 and is preferably large enough to permit a spoon or the like to be moved into the container 32 and removed with a desired quantity of material from the container 32. The material dispensing aperture 45 has one surface thereof flush with the inwardly facing surface of the inner wall portion 39. A rib or bead 46 extends inwardly from an inwardly facing surface of the inner wall portion 39 and provides a support for the closure member 43.

In the illustrated structure, a portion of the cap member top wall 37 is hingedly connected to the remaining portion of the cap member top wall 37 thereby defining the closure member 43. The portion of the cap member top wall defining the closure member 43 has a peripheral edge with a flange 47 extending therefrom and engageable with the inner wall portion 39 of the cap member side wall 36. The flange 47 extending from the closure member 43 engages the rib or bead 46 extending from the inner wall portion 39 of the cap member side wall 36 and is supported thereon.

The illustrated latch 42 has a first portion 48 extending from the closure member 43 and received in the guide way or recess 44 in the top wall 37 of the cap member 35. The latch 42 has a second portion 49 extending substantially perpendicular or normal to the first latch portion 48 and received in the guide way 41 in the cap member side wall 36.

The cap member side wall 36 and the latch member second portion 49 have cooperating means engageable one with the other for retaining the closure member 43 in covering relation with and closing the material dispensing aperture 45. In the illustrated structure, the side wall 36 of the cap member 35 has a downwardly inclined shoulder 50 formed within the guide way 41 in the cap member side wall 36. The illustrated shoulder 50 is formed in a lower edge of the outer wall portion 40 of the side wall 36. The latch member second portion 49 has a projection or rib defining an upwardly inclined shoulder 51 engageable with the downwardly inclined shoulder 50 on the outer wall portion 40 of the cap member side wall 36 so that resilient means 52 as later described, urge the latch member shoulder 51 into engagement with the shoulder 50 on the cap member side wall 36.

The resilient means 52 are illustrated as a leaf formed integral with and extending from the inner wall portion 39. The resilient leaf 52 has a length at least equal to the width of the guide ways 41 and 44 and the leaf 52 is positioned between the ribs or beads 46. The resilient leaf 52 engages the closure member 43 when the closure member 43 is in the closed position.

It is desirable to provide means on the closure member 43 engaged by the resilient leaf 52 for stiffening the closure member 43 and reducing the width or unsupported dimension of the resilient leaf 52 so that the leaf 52 is sufficiently stiff to hold the shoulders 50 and 51 in cooperation engagement. The illustrated closure member 43 has a pair of laterally spaced ribs 53 and 54 on the interior surface thereof and extending between the second latch portion 49 and the hinge connection of the closure member 43 to the remaining portion of the closure member top wall 37. The ribs 53 and 54 are substantially normal or perpendicular to the second latch portion 43.

Figure 2:
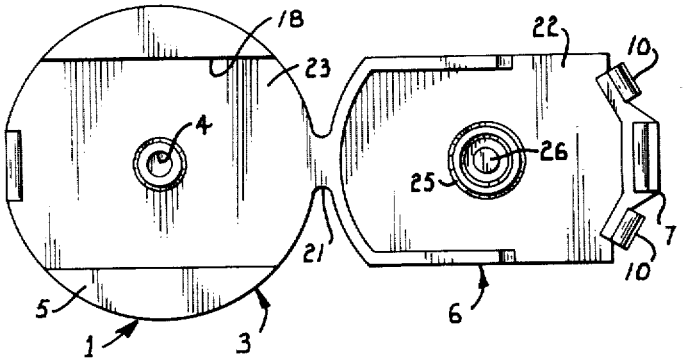
FIG. 2 is a top plan view of the container cover and closure structure and showing the closure member in the open position.
Figure 3:
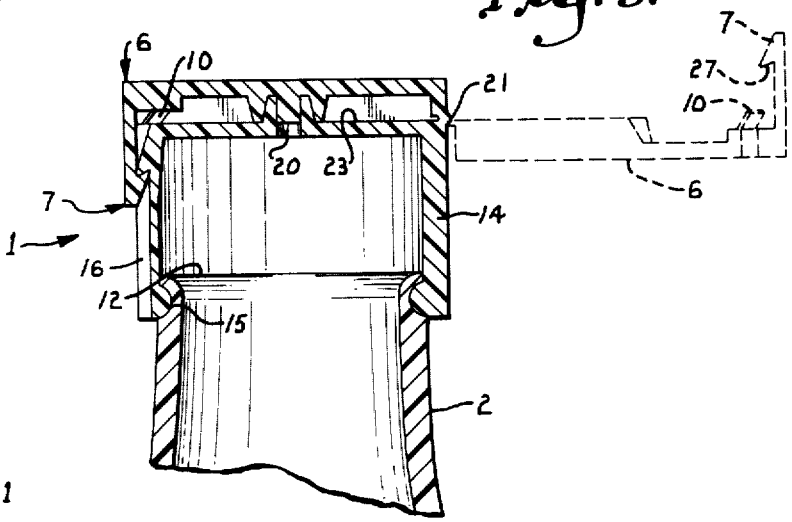
FIG. 3 is a vertical sectional view through the container cover and closure structure and showing the closure member in a closed position with the open position shown in broken lines.
Figure 4:
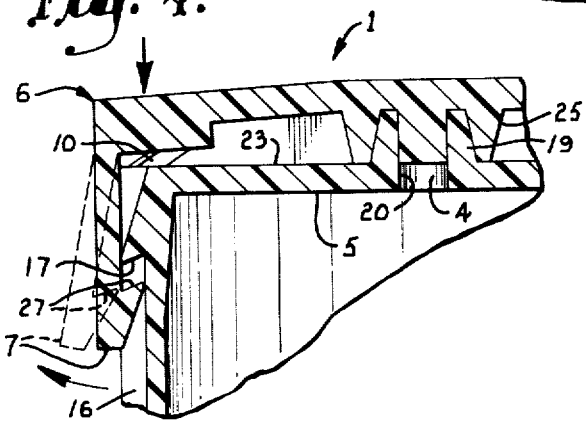
FIG. 4 is an enlarged fragmentary vertical sectional view showing a portion of the closure member moved toward a cap member to permit separation of a latch member prior to moving the closure member to the open position.

Use of the container cover and closure structure 31 illustrated in FIGS. 5 to 8 inclusive is similar in principle to the use of the cover and closure structure 1 illustrated in FIGS. 1 to 4 inclusive. To open the cover and closure structure 31, the closure member 43 is first moved toward the container 32 until the ribs 53 and 54 engage the surface defining the guide way 44 in the cap member top wall 37 so that the second latch portion 49 may be moved outwardly from the cap member side wall 36 and the closure member 43 then moved to an open position.

Figure 9:
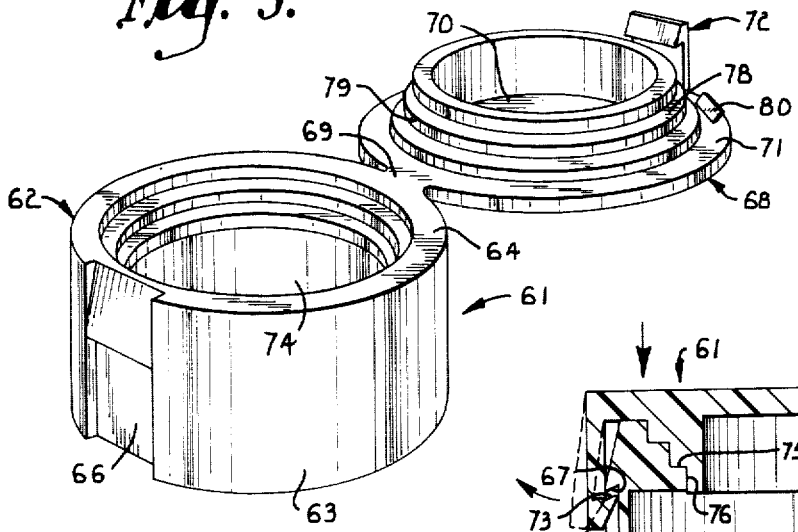
FIG. 9 is a perspective view of a second modified form of a container cover and closure structure and showing a modified closure structure in an open position.
Figure 12:
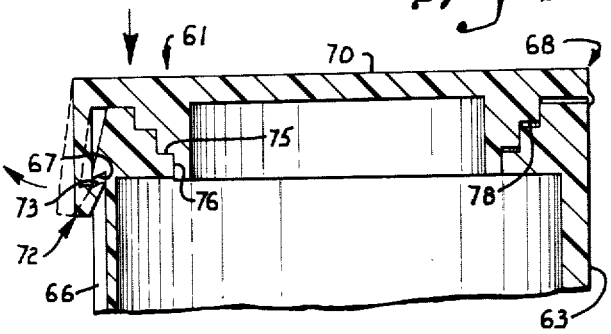
FIG. 12 is an enlarged fragmentary vertical sectional view showing a portion of the modified closure member moved toward a cap member to permit separation of a latch member prior to moving the modified closure member to the open position.
Figure 10:
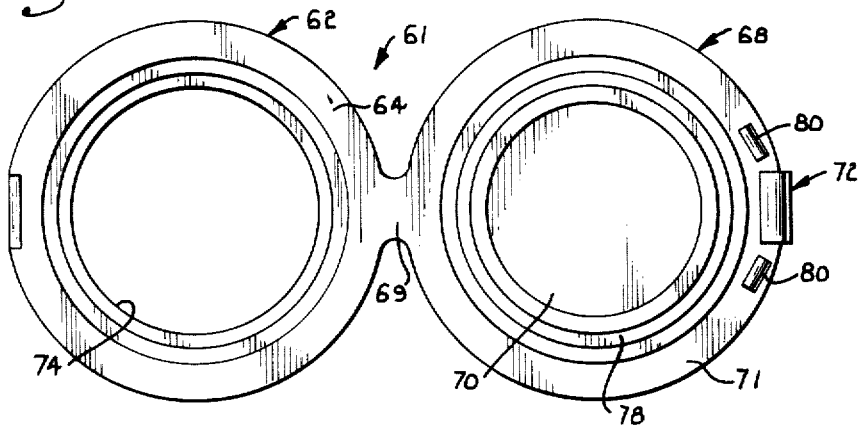
FIG. 10 is a top plan view of the second modified form of the container cover and closure structure and showing the modified closure structure in the open position.
Figure 11:
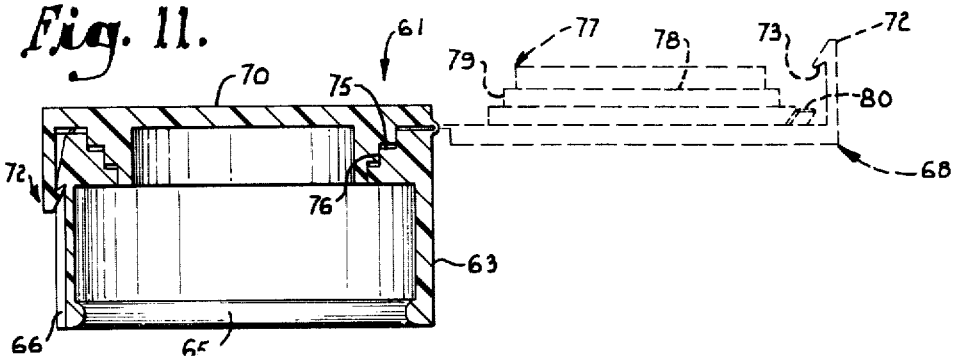
FIG. 11 is a vertical sectional view of the second modified form of the container cover and closure structure and showing the modified closure member in a closed position with the open position shown in broken lines.

FIGS. 9 to 12 inclusive illustrate a second modified form of a container cover and closure structure 61 also particularly adapted for use in dispensing of granular material, such as salt, sugar, pepper, spices, pills, tablets, and the like.

The cover and closure structure 61 includes a cap member 62 having a side wall 63 and a top wall 64. The cap member side wall 63 is suitably mounted on a container. In the illustrated embodiment, the interior surface of the cap member side wall 63 has an inwardly extending bead or rib 65 adjacent a lower edge thereof. The exterior surface of the cap member side wall 63 has means defining a guide way 66 therein and extending downwardly from the cap member top wall 64. A downwardly inclined shoulder 67 is formed within the guide way 66 and is positioned adjacent the top wall 64.

The container cover and closure structure 61 includes a closure member 68 hingedly connected to the cap member top wall 64 by a hinge portion 69. The closure member 68 has a planar wall portion 70 with a peripheral edge portion 71. A latch member 72 extends from the peripheral edge portion 71 of the planar wall portion 70. The latch member 72 is received in the guide way 66 in the cap member side wall 63.

The latch 72 has a rib or projection on the surface thereof in facing relation with the cap member side wall 63 and the projection or rib has an upwardly inclined shoulder 73 which is engageable with the downwardly inclined shoulder 67 on the cap member side wall 63.

A material dispensing aperture 74 is formed in the cap member top wall 64. A plurality of concentric laterally or circumferentially spaced upwardly facing shoulders 75 are formed in the cap member top wall 64 and surround the material dispensing aperture 74. The cap member top wall 64 has a plurality of laterally spaced concentric inwardly facing surfaces 76 each extending from a respective one of the upwardly facing shoulders 75.

The wall portion 70 of the closure member 68 is movable into covering relation with the material dispensing aperture 74 and has means thereon to close same. A projection 77 extends from the planar wall portion 70 of the closure member 68 and is received in the material dispensing aperture 74.

The closure member projection 77 has a plurality of laterally spaced downwardly facings shoulders 78 each positioned in facing relation with and normally spaced from a respective one of the upwardly facing shoulder 75 on the cap member top wall 64 when the projection 77 is within the material dispensing aperture 74. The closure member projection 77 also has a plurality of outwardly facing surfaces 79 each extending from a respective one of the downwardly facing shoulders 78 and each positioned in sliding and frictional engagement with a respective one of the inwardly facing surfaces 76 on the cap member top wall 64 when the projection 77 is in a closing the material dispensing aperture 74.

Resilent members or leaves 80 are formed on and extend from one of the closure member 68 and the cap member 62 and are effective to maintain the shoulders 67 and 73 in engagement one with the other and thereby maintain a spaced relation between the shoulders 75 and 78 on the cap member top wall 64 and the closure member 68 respectively. In the illustrated embodiment, the resilient members 80 extend from the peripheral edge portion 71 of the closure member wall portion 70 and engage the cap member top wall 64.

Use of the container cover and closure structure 61 illustrated in FIGS. 9 to 12 inclusive is substantially similar to use of the cover and closure structure 1 and 31 illustrted in FIGS. 1 to 4 inclusive and FIGS. 5 to 8 inclusive. To open the cover and closure structure 61, the closure member 68 is moved towards the cap member top wall 64 until the shoulders 75 and 78 are in engagement so that the latch 72 may be moved outwardly from the cap members side wall 63 and the closure member 68 moved to an open position.

Figure 13:
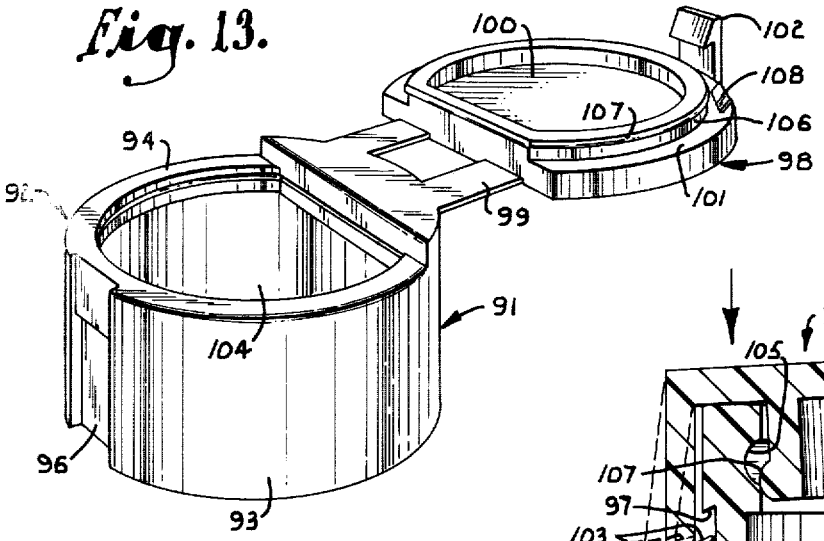
FIG. 13 is a perspective view of a third modified form of the container cover and closure structure and showing a modified closure member in an open position.
Figure 16:
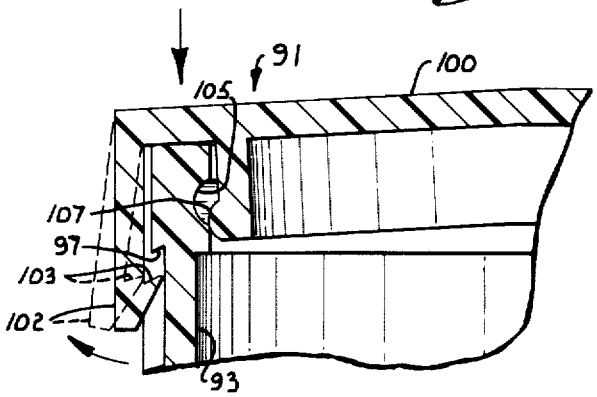
FIG. 16 is an enlarged fragmentary vertical sectional view showing a portion of the modified closure member moved toward a cap member to permit separation of a latch member prior to moving the modified closure member to the open position.
Figure 14:
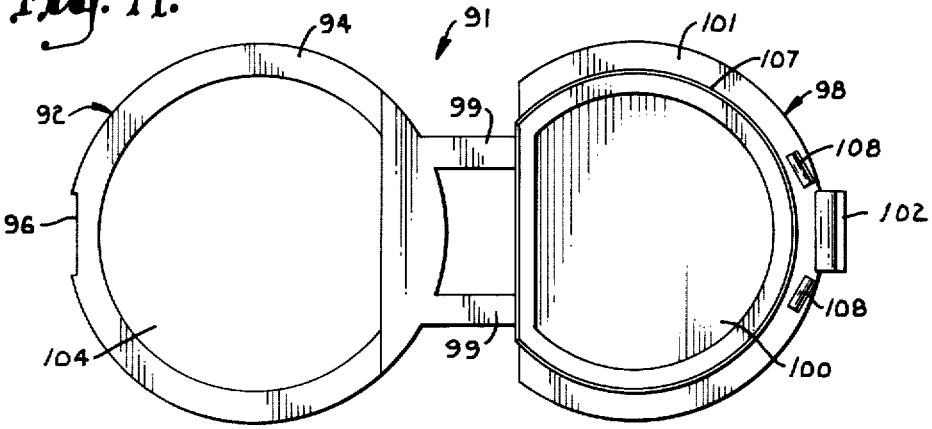
FIG. 14 is a top plan view of the third modified form of the container cover and closure structure and showing the modified closure member in the open position.
Figure 15:
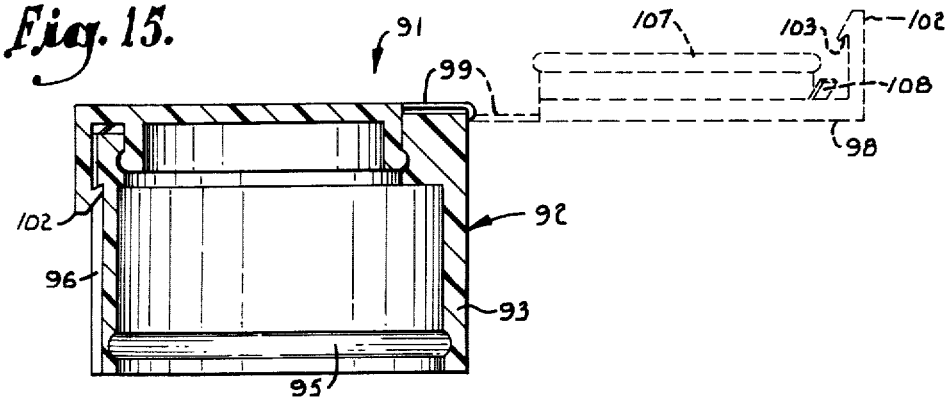
FIG. 15 is a vertical sectional view of the third modified form of the cover and closure structure and showing the modified closure member in a closed position with the open position shown in broken lines.

FIGS. 13 to 16 inclusive illustrate a third modified form of a container cover and closure structure 91 also particularly adapted for use in dispensing of granular material, such as salt, sugar, pepper, spices, pills, tablets, and the like. The cover and closure structure 91 includes a cap member 92 having a side wall 93 and a top wall 94. The cap member side wall 93 is suitably mounted on a container. In the illustrated embodiment, the interior surface of the cap member side wall 93 has a recess 95 therein positioned adjacent a lower edge of the side wall 93. The recess 95 is adapted to receive therein an outwardly extending lip (not shown) on the upper portion of the container. The exterior surface of the cap member side wall 93 has means defining a guide way 96 therein extending between upper and lower edges of the cap member side wall 93. A downwardly inclined shoulder 97 is formed within the guide way 96 and positioned adjacent the upper edge of the cap member side wall 93.

The cover and closure structure 91 includes a closure member 98 hingedly mounted on or connected to the cap member 92 by a pair of laterally spaced hinge straps 99. The closure member 98 has a planar wall portion 100 with a peripheral edge portion 101. A latch 102 extends from the peripheral edge portion 101 of the planar wall portion 100. The latch 102 is received in the guide way 96 in the cap member side wall 93.

The latch 102 has a rib or projection on the surface thereof in facing relation with the cap member side wall 93 and the rib has an upwardly inclined shoulder 103 which is engageable with the downwardly inclined shoulder 97 on the cap member side wall 93.

A material dispensing aperture 104 is formed in the cap member 92. The top wall 94 is illustrated as an enlarged portion of the side wall 93 and extending inwardly therefrom. The top wall 94 has a recess 105 in the inwardly facing surface of the enlarged portion of the side wall 93 defining the top wall 94.

The planar wall portion 100 of the closure member 98 is movable into covering relation with and closing the material dispensing aperture 104 so that the peripheral edge portion 101 of the wall portion 100 in covering relation with the upper edge of the side wall 93. A rib or flange 106 extends from the wall portion 100 of the closure member 98 and is in engagement with the inwardly facing surface of the enlarged portion of the side wall 93 defining the top wall 94. The rib or flange 106 has a bead 107 on the exterior surface thereof and the bead 107 is adapted to be received in the recess 105 in the inwardly facing surface of the enlarged portion of the side wall 93 defining the top wall 94 so that the closure member 98 is retained in a closed position.

Resilient members or leaves 108 are formed on and extend from one of the closure member 98 and the cap member 92 and are effective to maintain the shoulders 97 and 103 in engagement one with the other and maintain a spaced relation between the upper edge of the cap member side wall 93 and the closure member peripheral edge portion 101. In the illustrated embodiment, the resilient members 108 extend from the peripheral edge portion 101 of the closure member 98 and engage the upper edge of the cap member side wall 93.

Use of the cover and closure structure 91 illustrated in FIGS. 13 to 16 inclusive is substantially similar to use of the container cover and closure structure 61 illustrated in FIGS. 9 to 12 inclusive. To open the cover and closure structure 91, the peripheral edge portion 101 of the closure member wall portion 100 is moved toward the upper edge of the cap member top wall 94 or upper edge of the cap member side wall 92 until the shoulders 97 and 103 may be separated so that the latch 102 may be moved outwardly from the cap member side wall 93 and the closure member 98 moved to an open position by lifting on the peripheral edge portion 101 which moves the bead 107 out of the recess 105 in the top wall 94 of the cap member 92.

It is to be understood that while I have illustrated and described certain forms of my invention, it is not to be limited to these specific forms or arrangement of parts herein described and shown.

What I claim and desire to secure by Letters Patent is:

1. A safety container comprising:

a. container body having a side wall and a top wall, said top wall having a material dispensing aperture;

b. a closure member hingedly mounted on said top wall, said closure member being defined by a wall portion having a peripheral edge;

c. means on said closure member for closing the material dispensing aperture when said closure member is in covering relation with said material dispensing aperture;

d. a latch member on one of said closure member and container, said latch member extending from the peripheral edge of said wall portion of said closure member;

e. cooperating means on the other of said closure member and said container and on said latch member and engageable one with the other for retaining said closure member in covering relation with said material dispensing aperture;

f. resilient means on one of said closure member and said container for urging said cooperating means into retaining engagement, a portion of said closure member being movable toward said container against resistance of said resilient means to permit separation of said cooperating means on said latch member and other of said closure member and container; and g. said cooperating means for retaining said closure member in covering relation with said material dispensing aperture includes:

1. a downwardly inclined shoulder on said side wall of said container body; and 2. an upwardly inclined shoulder on said latch member and engageable with said downwardly inclined shoulder on said container body whereby said resilient means urge said latch member shoulder into engagement with said container body shoulder.

2. A safety container comprising:

a. a container body having a side wall and a top wall, said top wall having a material dispensing aperture;

b. a closure member hingedly mounted on said top wall;

c. means on said closure member for closing the material dispensing aperture when said closure member is in covering relation with said material dispensing aperture;

d. a latch member on one of said closure member and container;

e. cooperating means on the other of said closure member and said container and on said latch member and engageable one with the other for retaining said closure member in covering relation with said material dispensing aperture;

f. resilient means on one of said closure member and said container for urging said cooperating means into retaining engagement, a portion of said closure member being movable toward said container against resistance of said resilient means to permit separation of said cooperating means on said latch member and other of said closure member and container;

g. means defining a guide way in said container body side wall and intersecting the guide way in said container body top wall;

h. means on said closure member defining a wall portion with opposite end edges, said latch member extending from one of the opposite end edges of said closure member and being received in said guide way in said container body side wall; and i. said cooperating means for retaining said closure member in covering relation with said material dispensing aperture including:

1. means defining a downwardly inclined shoulder within the guide way in said container body side wall; and 2. means defining an upwardly inclined shoulder on said latch member and engageable with said downwardly inclined shoulder within the guide way in said container body side wall whereby said resilient means urge said latch member shoulder into engagement with said shoulder within the guide way in said container body.

3. A safety container comprising:

a. a container body having a side wall and a top wall, said top wall having a material dispensing aperture;

b. a closure member hingedly mounted on said top wall;

c. means on said closure member for closing the material dispensing aperture when said closure member is in covering relation with said material dispensing aperture;

d. a latch member on one of said closure member and container;

e. [cooperation] *cooperating* means on the other of said closure member and said container and on said latch member and engageable one with the other for retaining said closure member in covering relation with said material dispensing aperture;

f. resilient means on one of said closure member and said container for urging said cooperating means into retaining engagement, a portion of said closure member being movable toward said container against resistance of said resilient means to permit separation of said cooperating means on said latch member and other of said closure member and container;

g. said side wall of said container body includes an inner wall portion and an outer wall portion;

h. one portion of said container body top wall is hingedly connected to a remaining portion of said container body top wall thereby defining said closure member;

i. the one portion of said container body top wall defining said closure member includes a peripheral edge and a flange extending from the peripheral edge of said closure member and engageable with the inner wall portion of said container body side wall;

j. said resilient means extend from the inner wall portion of said container body side wall and are engageable with said closure member;

k. means defining a guide recess in said container body side wall and extending between the outer wall portion and the inner wall portion of said container body side wall, the guide recess in said container body side wall being aligned with said resilient means, said latch member extending from said closure member and having a portion received in said guide recess in said container body side wall; and l. said cooperating means for retaining said closure member in covering relation with said material dispensing aperture including:

1. means defining a downwardly inclined shoulder on said container body side wall and aligned with said guide recess in said container body side wall; and 2. means defining an upwardly inclined shoulder on said latch member and engageable with said downwardly inclined shoulder on said container body side wall whereby said resilient means urge said latch member shoulder into engagement with said shoulder on said container body side wall.

4. A safety container comprising:

a. a container body having a side wall and a top wall, said top wall having a material dispensing aperture;

b. a closure member hingedly mounted on said top wall;

c. means on said closure member for closing the material dispensing aperture when said closure member is in covering relation with said material dispensing aperture;

d. a latch member on one of said closure member and container;

e. cooperating means on the other of said closure member and said container and on said latch member and engageable one with the other for retaining said closure member in covering relation with said material dispensing aperture[, said cooperating means including:]*;*

[1. a downwardly inclined shoulder on said container body side wall; and]

[2. an upwardly inclined shoulder on said latch member and engageable with said downwardly inclined shoulder on said container body whereby said resilient means urge said latch member shoulder into engagement with said container body shoulder; and]

f. resilient means on one of said closure member and said container for urging said cooperating means into retaining engagement, a portion of said closure member being movable toward said container against resistance of said resilient means to permit separation of said cooperating means on said latch member and other of said closure member and container[.]*; and*

*g. said cooperating means for retaining said closure member in covering relation with said material dispensing aperture includes:*

*1. a downwardly inclined shoulder on said container body side wall; and*

*2. an upwardly inclined shoulder on said latch member and engageable with said downwardly inclined shoulder on said container body whereby said resilient means urge said latch member shoulder into engagement with said container body shoulder.*

5. A safety container comprising:

a. a container body having a side wall and a top wall, said top wall having a material dispensing aperture;

b. a closure member hingedly mounted on said top wall;

c. means on said closure member for closing the material dispensing aperture when said closure member is in covering relation with said material dispensing aperture;

d. a latch member on one of said closure member and container; and e. cooperating means on the other of said closure member and said container and on said latch member and engageable one with the other for retainer said closure member in covering relation with said material dispensing aperture[, said cooperating means including:]*;*

*f. resilient means on one of said closure member and said container for urging said cooperating means into retaining engagement, a portion of said closure member being movable toward said container against resistance of said resilient means to permit separation of said cooperating means on said latch member and other of said closure member and container; and*

*g. said cooperating means for retaining said closure member in covering relation with said material dispensing aperture includes:*

1. a first inclined shoulder on the latch member; and
2. a second inclined shoulder on the other of the closure member and container from the one on which the latch is on, said first and second inclined shoulders being opposite with one inclined downwardly and the other upwardly whereby said resilient means urge said first inclined shoulder into engagement with said second inclined shoulder.

6. A safety container as set forth in claim 1 including:

a. means defining a guide way in said container body top wall;

b. a tubular portion defining said material dispensing aperture and having a bore through the tubular portion, said tubular portion extending upwardly from the top wall of said container body and being positioned within said guide way in said container body top wall;

c. means on said closure member received within said guide way in said container body top wall for positioning said closure member relative to said material dispensing aperture; and d. a sleeve portion extending from said closure member and defining said means for closing said material dispensing aperture, said sleeve portion surrounding said tubular portion when said closure member is in covering relation with said material dispensing aperture, said sleeve portion of said closure member and said tubular portion of said container body being spaced from said cooperating means for retaining said closure member in covering relation with said material dispensing aperture.

7. A safety container as set forth in claim 3 including:

a. means defining a lower edge on said outer wall portion of said container body side wall;

b. means on the lower edge of said outer wall portion of said container body side wall defining said downwardly inclined shoulder; and c. a latch member second portion extending from said first named portion of said latch member, said upwardly inclined shoulder being formed on said latch member second position.

8. A safety container as set forth in claim 4 including:

a. means defining a guide way in said container body side wall, said downwardly inclined shoulder being positioned within said guide way in said container body side wall; and b. means on said closure member defining a planar wall portion with a peripheral edge portion, said latch member extending from the peripheral edge portion of said planar wall portion of said closure member and being received within the guide way in said container body side wall.

9. A safety container as set forth in claim 8 including:

a. means on said closure member top wall defining a plurality of laterally spaced upwardly facing shoulders surrounding the material dispensing aperture;

b. means on said closure member top wall defining a plurality of concentric inwardly facing surfaces each extending from a respective one of said upwardly facing shoulders;

c. means on said closure member planar wall portion defining a projection extending from said planar wall portion and received in said material dispensing aperture;

d. means on said closre member projection defining a plurality of laterally spaced downwardly facing shoulders and a plurality of concentric outwardly facing surfaces each extending from a respective one of said downwardly facing shoulders; and e. means extending from said closure member planar wall portion defining said resilient means, said resilient means being engageable with said closure member top wall to thereby resiliently support said closure member with said downwardly facing shoulders of said closure member in spaced relation above said upwardly facing shoulders of said closure member top wall.

10. A safety container as set forth in claim 8 including:

a. means on said container body top wall defining an inwardly facing surface thereby defining the material dispensing aperture;

b. means on said inwardly facing surface of said container body top wall defining a recess therein;

c. means on said closure member defining a rib extending from said planar wall portion and engageable with said inwardly facing surface of said cap member top wall; and d. a bead extending from said rib extending from said planar wall portion of said closure member and being received in said recess in said inwardly facing surface of said container body top wall when said closure member is in covering relation with said material dispensing aperture.

11. A safety container as set forth in claim 3 wherein:

a. said container body includes a separable cap member having a side wall and a top wall;

b. said cap member side wall includes means engageable with said container body for retaining said cap member on said container body; and c. said cap member side wall includes an inner wall portion and an outer wall portion each engageable with said container body.

12. A safety container as set forth in claim 11 wherein:

a. one portion of said cap member top wall is hingedly connected to a remaining portion of said cap member top wall thereby defining said closure member;

b. the one portion of said cap member top wall defining said closure member includes a peripheral edge and a flange extending from the peripheral edge of said closure member and engageable with the inner wall portion of said cap member side wall; and c. said resilient means extend from the inner wall portion of said cap member side wall and are engageable with said closure member.

13. A safety container as set forth in claim 12 wherein:

a. said cap member side wall includes means defining a guide recess extending between the outer wall portion and the inner wall portion of said cap member sid wall;

b. said guide recess in said cap member side wall is aligned with said resilient means;

c. said latch member extends from said closure member and includes a portion received in said guide recess in said cap member side wall; and d. said first and second shoulders of the cooperating means for retaining said closure member in covering relation with said material dispensing aperture includes:

1. means defining a downwardly inclined shoulder on said cap member side wall and aligned with said guide recess in said cap member side wall; and 2. means defining an upwardly inclined shoulder on said latch member and engageable with said downardly inclined shoulder on said cap member side wall whereby said resilient means urge said latch member shoulder into engagement with said shoulder on said cap member side wall.

14. A safety container as set forth in claim 13 including:

a. means defining a lower edge on said outer wall portion of said cap member side wall;

b. means on said lower edge of said outer wall portion of said cap member side wall defining said downwardly inclined shoulder; and c. a latch member second portion extending from said first named portion of said latch member, said upwardly inclined shoulder being formed on said latch member second portion.

*15. A safety container comprising:*

*a. a container body having a side wall and an end wall, said end wall having a material dispensing means disposed thereon;*

*b. a closure member hingedly mounted on said end wall;*

*c. means on said closure member for preventing discharge from the material dispensing means when said closure member is in covering relation with said material dispensing means;*

*d. a latch member on one of said closure member and container; and*

*e. cooperating means on the other of said closure member and said container, and on said latch member and engageable one with the other for retainer said closure member in covering relation with said material dispensing means;*

*f. resilient means on one of said closure member and said container for urging said cooperating means into retaining engagement, a portion of said closure member being movable toward said container against resistance of said resilient means to permit separation of said cooperating means on said latch member and other of said closure member and container; and*

*g. said cooperating means for retaining said closure member in covering relation with said material dispensing means includes:*

*1. a first inclined shoulder on the latch member; and*

*2. a second inclined shoulder on the other of the closure member and container from the one on which the latch is on, said first and second inclined shoulders being opposite with one inclined downwardly and the other upwardly whereby said resilient means urge said first inclined shoulder into engagement with said second inclined shouder.*

* * * * *